United States Patent
Zlotnick et al.

(10) Patent No.: US 6,886,136 B1
(45) Date of Patent: Apr. 26, 2005

(54) AUTOMATIC TEMPLATE AND FIELD DEFINITION IN FORM PROCESSING

(75) Inventors: Aviad Zlotnick, Mizpeh Netofa (IL); Ronen Shevach, Netanya (IL); Eugene Wallach, Haifa (IL); Oren Kagan, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/566,058

(22) Filed: May 5, 2000

(51) Int. Cl.[7] .............................................. G09G 5/377
(52) U.S. Cl. ...................... 715/780; 382/317; 715/505; 358/462
(58) Field of Search ...................... 358/462; 382/317; 715/505, 780

(56) References Cited

U.S. PATENT DOCUMENTS

| | | | |
|---|---|---|---|
| 5,140,650 A | * | 8/1992 | Casey et al. ................ 382/283 |
| 5,182,656 A | * | 1/1993 | Chevion et al. ............ 358/452 |
| 5,191,525 A | * | 3/1993 | LeBrun et al. .............. 715/500 |
| 5,394,487 A | * | 2/1995 | Burger et al. ................ 382/209 |
| 5,631,984 A | * | 5/1997 | Graf et al. ................... 382/317 |
| 5,793,887 A | | 8/1998 | Zlotnick |
| 6,038,351 A | * | 3/2000 | Rigakos ...................... 382/305 |

OTHER PUBLICATIONS

IBM Technical Disclosure Bulletin, "Converting Paper Documents to Electronic Images with Automatic Document Recognition, Index Generation and Template Removal", vol 34, pp. 435–439.*

* cited by examiner

Primary Examiner—Raymond J. Bayerl
Assistant Examiner—Dennis Bonshock
(74) Attorney, Agent, or Firm—Darby & Darby

(57) ABSTRACT

A method for processing a plurality of input images containing variable content that is filled into respective, fixed templates. The method includes comparing the images to collect a group of the images having a high degree of similarity therebetween, and combining the images in the group so as to distinguish the variable content from a fixed portion common to a preponderant number of the images in the group. The fixed portion is processed to reconstruct the fixed template that is common to at least some of the images among the preponderant number, and information is extracted from the images using the reconstructed template.

23 Claims, 7 Drawing Sheets

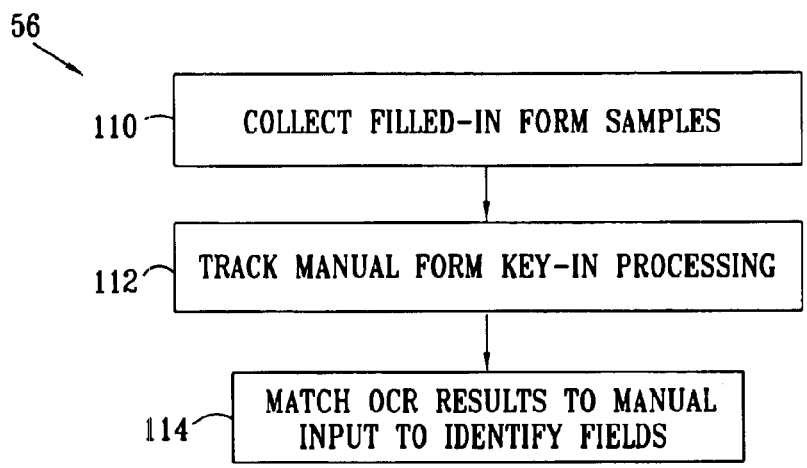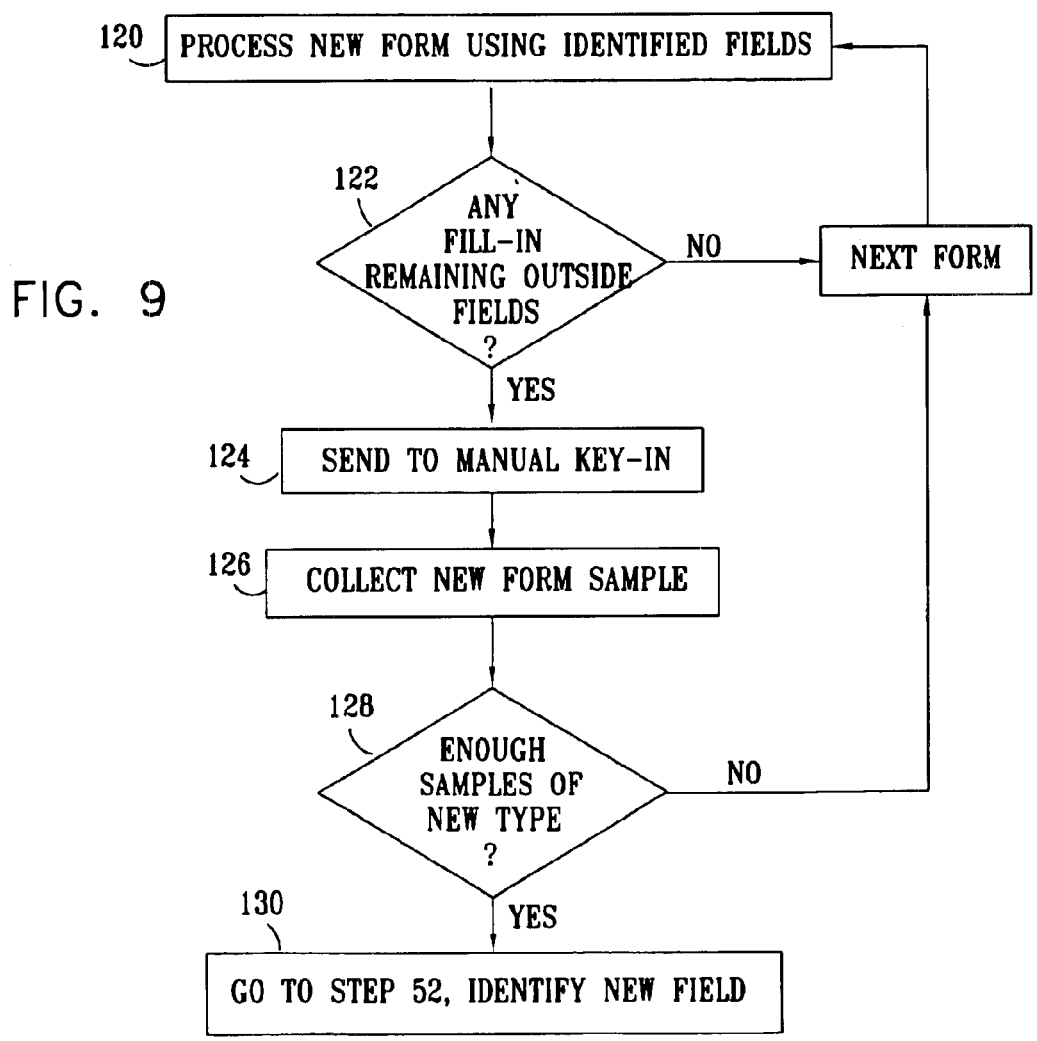

AUTOMATIC TEMPLATE AND FIELD DEFINITION IN FORM PROCESSING

FIELD OF THE INVENTION

The present invention relates generally to document image processing, and specifically to methods for recognition of preprinted form documents and extraction of information that is filled into them.

BACKGROUND OF THE INVENTION

In many document imaging systems, large numbers of forms are scanned into a computer, which then processes the resultant document images to extract pertinent information. Typically the forms comprise pre-printed templates, containing fields that have been filled in by hand or with machine-printed characters. To extract the information that has been filled in, the computer must first identify the fields of the template and then decipher the characters appearing in the fields. Various methods of image analysis and optical character recognition (OCR) are known in the art for these purposes.

In order to identify the fields of the template and assign the characters to the correct fields, a common technique is for the computer to register each document image with a reference image of the template. Once the template is registered, it can be dropped from the document image, leaving only the handwritten or printed characters in their appropriate locations on the page. For example, U.S. Pat. Nos. 5,182,656, 5,191,525 and 5,793,887, whose disclosures are incorporated herein by reference, describe methods for registering a document image with a form template so as to extract the filled-in information from the form. Once the form is accurately registered with the known template, it is a simple matter for the computer to assign the fill-in characters to the appropriate fields. Dropping the template from the document image also reduces substantially the volume of memory required to store the image.

Methods of automatic form processing known in the art, such as those described in the above-mentioned patents, assume as their point of departure that the form template is known in advance, or at least can be selected by the computer from a collection of templates that are known in advance. In other words, the computer must have on hand the appropriate empty template for every form type that it processes, together with a definition of the locations and content of all of the fields in the form. This information is typically input to the computer by an expert operator before starting up processing operations. In large-scale form-processing applications, however, it frequently happens that not all template or template variations are known at start-up, or that unexpected variations occur. The variant forms are rejected by the computer and must be passed to manual processing—either for manual key-in of the data or to train the computer to deal with the new templates. Needless to say, any involvement by a human operator increases the cost and time required for processing, as well as increasing the likelihood of errors.

SUMMARY OF THE INVENTION

It is an object of the present invention to provide improved methods and systems for automated image processing, and particularly for automated processing of template-based form document images.

It is a further object of some aspects of the present invention to provide methods for automatically recreating an unknown template that was used to a create a group of form documents.

It is yet a further object of some aspects of the present invention to provide methods for automatically determining the type of information contained in an unidentified field in a form document.

In preferred embodiments of the present invention, a document image processing system receives images of forms, at least some of which are based on templates that are not known in advance. At least a portion of these images are automatically sorted into a group that appears to have a common template. The system aligns the images in the group and compares them with one another to extract a part of the images that is relatively invariant from one image to the next. This invariant part is assumed to correspond to the common template, and not to the variable information that is filled into each form. Forms that do not include this template are rejected from the group (possibly to be a part of another group). The template is then used by the system in processing the images in the group, and preferably in processing images of similar forms that are subsequently input to the system, as well.

In some preferred embodiments of the present invention, the system automatically determines the unknown identities of fields in a form template. The system finds the locations of the fields in a group of one or more forms having a common template, and extracts the information contained in the fields,—typically using methods of optical character recognition (OCR) known in the art. The same forms are processed by a human operator, who keys in the contents of the fields alongside the appropriate field identifications. By matching the field contents that it has extracted with the contents keyed-in by the human operator, the system is able to identify automatically which field is which. Preferably, the system repeats this process over a large enough number of forms so that all of the fields corresponding to a given template are identified with a high level of confidence. The system is thus able to "learn" the locations and identities of the fields in a new template automatically, substantially without the intervention of an expert operator. Once the system has learned the field locations and identities, it can process subsequent forms based on this template fully automatically, without the need for any manual key-in.

Although in preferred embodiments described herein, methods of template extraction and field identification are used together, these techniques and the principles embodied therein may also be used independently of one another. Furthermore, although these preferred embodiments relate to processing of images of form documents, the principles of the present invention may similarly be applied in extracting information from groups of images of other types, in which the images in a group contain a common, fixed part and an individual, variable part.

There is therefore provided, in accordance with a preferred embodiment of the present invention, a method for processing a plurality of input images containing variable content that is filled into respective, fixed templates, the method including:

comparing the images to collect a group of the images having a high degree of similarity therebetween;

combining the images in the group so as to distinguish the variable content from a fixed portion common to a preponderant number of the images in the group;

processing the fixed portion to reconstruct the fixed template that is common to at least some of the images among the preponderant number; and extracting information from the images using the reconstructed template.

Preferably, combining the images includes mutually aligning and summing the images, wherein each of the input images includes a plurality of pixels having respective pixel values, and wherein summing the images includes generating a gray-scale image in which the gray-scale value of each pixel is a sum of the pixel values of the corresponding pixels in the input images. Typically, the pixels in the fixed portion of the gray-scale image are characterized generally by higher gray-scale values than the other pixels in the gray-scale image.

In a preferred embodiment, combining the images includes binarizing the gray-scale image, so that the pixels in the fixed portion generally receive a first binary value, and the pixels corresponding to the variable content generally receive a second, different binary value. Preferably, binarizing the gray-scale image includes testing a plurality of binarization thresholds so as to find one of the threshold that optimally distinguishes the variable content from the fixed portion.

Preferably, processing the fixed portion includes choosing one of the images from among the preponderant number and combining the chosen image with the fixed portion common to the preponderant number in order to extract the template from the chosen image. Most preferably, choosing the one of the images includes choosing an image having a high measure of similarity to the fixed portion.

In a preferred embodiment, extracting the information includes removing the reconstructed template from the images.

Preferably, extracting the information includes finding, responsive to the template, respective locations of fields in the images that contain the information and automatically extracting the information contained in the fields. Most preferably, reading the information contained in the fields includes:

processing one or more of the images in the group manually, so as to record, for each of the fields, the information filled into the field in conjunction with an identification of the field; and automatically comparing the manually-recorded information with the automatically-extracted information to find, for each of the fields, a correspondence between the identification of the field and its location.

In a preferred embodiment, the input images include images of documents on which the respective templates are pre-printed, and wherein the variable content includes alphanumeric characters filled into fields of the templates.

There is further provided, in accordance with a preferred embodiment of the present invention, a method for processing a group of images containing variable information that is filled into a common template, the method including:

processing one or more of the images automatically to determine respective locations of fields in the images that are filled in with the variable information;

automatically extracting the information from the fields;

processing the one or more images manually, so as to record, for each of the fields, the information filled into the field in conjunction with an identification of the field;

automatically comparing the manually-recorded information with the automatically-extracted information to find, for each of the fields, a correspondence between the identification of the field and its location; and processing additional images in the group to automatically extract the variable information therefrom and, using the correspondence, to identify the extracted information.

Preferably, automatically extracting the information includes reading alphanumeric characters contained in the fields.

In a preferred embodiment, processing the additional images includes detecting, in one of the additional images, information in a new location that does not correspond to any of the fields for which the correspondence was found, and sending the one of the additional images to be processed manually. Preferably, automatically extracting the information from the fields includes extracting the information in the new location, and wherein automatically comparing the manually-recorded information with the automatically-extracted information includes finding a correspondence between the new location and an identification of a field in the new location.

In a preferred embodiment, the images include images of documents on which the template is pre-printed, and the variable information includes alphanumeric characters filled into fields of the templates.

There is also included, in accordance with a preferred embodiment of the present invention, image processing apparatus, including:

an image input device, which is adapted to provide a plurality of input images containing variable content that is filled into respective, fixed templates; and a processor, which is adapted to receive and compare the images to collect a group of the images having a high degree of similarity therebetween, to combine the images in the group so as to distinguish the variable content from a fixed portion common to a preponderant number of the images in the group, to process the fixed portion to reconstruct the fixed template that is common to at least some of the images among the preponderant number, and to extract information from the images using the reconstructed template.

There is additionally provided, in accordance with a preferred embodiment of the present invention, image processing apparatus, including:

an image input device, which is adapted to provide a group of images containing variable information that is filled into a common template; and a processor, which is adapted to process one or more of the images automatically to determine respective locations of fields in the images that are filled in with the variable information, to automatically extract the information from the fields and to compare the automatically-extracted information with manually-extracted information, recorded in manual processing of the images and including, for each of the fields, the information filled into the field in conjunction with an identification of the field, so as to automatically find, for each of the fields, a correspondence between the identification of the field and its location, and to process additional images in the group to automatically extract the variable information therefrom and, using the correspondence, to identify the extracted information.

There is moreover provided, in accordance with a preferred embodiment of the present invention, a computer software product for processing a plurality of input images containing variable content that is filled into respective, fixed templates, the product including a computer-readable medium in which computer program instructions are stored, which instructions, when read by a computer, cause the computer to compare the images to collect a group of the images having a high degree of similarity therebetween, to combine the images in the group so as to distinguish the variable content from a fixed portion common to a preponderant number of the images in the group, to process the fixed portion to reconstruct the fixed template that is common to at least some of the images among the preponderant number, and to extract information from the images using the reconstructed template.

There is furthermore provided, in accordance with a preferred embodiment of the present invention, a computer software product for processing a group of images containing variable information that is filled into a common template, the product including a computer-readable medium in which computer program instructions are stored, which instructions, when read by a computer, cause the computer to process one or more of the images automatically to determine respective locations of fields in the images that are filled in with the variable information, to automatically extract the information from the fields and to compare the automatically-extracted information with manually-extracted information, recorded in manual processing of the images and including, for each of the fields, the information filled into the field in conjunction with an identification of the field, so as to automatically find, for each of the fields, a correspondence between the identification of the field and its location, and to process additional images in the group to automatically extract the variable information therefrom and, using the correspondence, to identify the extracted information.

The present invention will be more fully understood from the following detailed description of the preferred embodiments thereof, taken together with the drawings in which:

BRIEF DESCRIPTION OF THE DRAWINGS

FIGS. 8 and 9 are flow charts that schematically illustrate methods for automatically identifying fields in a form document image, in accordance with preferred embodiments of the present invention.

DETAILED DESCRIPTION OF PREFERRED EMBODIMENTS

Figure 1:
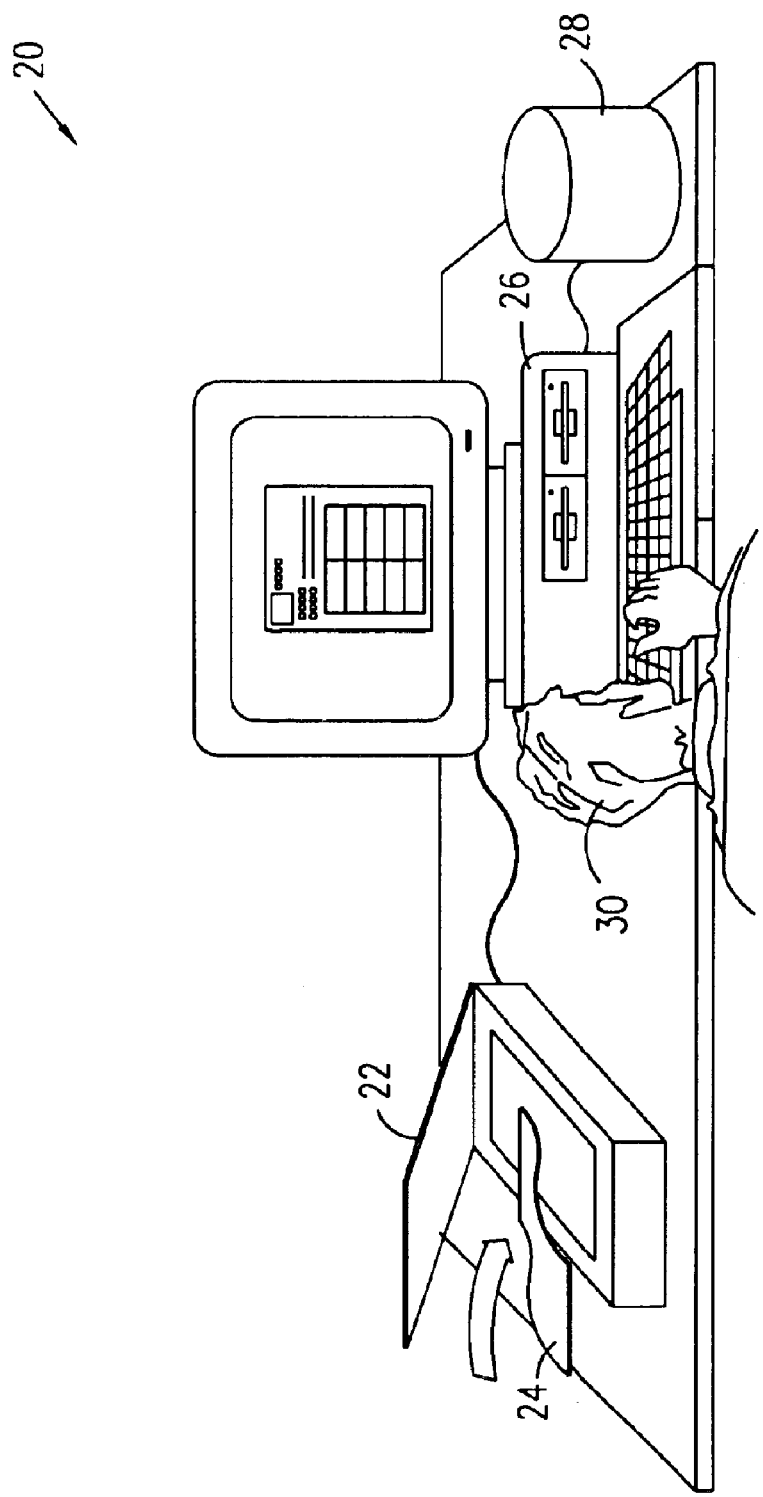
FIG. 1 is a schematic, pictorial illustration of a system for document image processing, in accordance with a preferred embodiment of the present invention.

FIG. 1 is a schematic, pictorial illustration of a system 20 for processing of form document images, in accordance with a preferred embodiment of the present invention. System 20 comprises a scanner 22, or any suitable type of image capture device known in the art, which receives and scans a document 24 comprising a preprinted form, which is typically filled in with handwritten, typed or printed characters. The scanner captures an image of the document and conveys the corresponding image data to a form processor 26, typically comprising a suitable general-purpose computer. Alternatively, the image is input to the processor from another source. Processor 26 attempts to register the document image with one of a plurality of reference template images that are stored in a memory 28, such as a magnetic or optical disk. The registered template is used to identify the fields in document 24. Preferably, the processor removes the template from the document image and reads out the characters that are filled into the form, typically using optical character recognition (OCR) methods known in the art.

When no suitable template is found in memory 28 for a group of document images, processor 26 attempts to generate an appropriate new template, as described hereinbelow. Additionally or alternatively, the processor determines the identities of the fields in the template. Typically, for the purpose of determining the field identities, the processor makes use of information that is read from the same document images by a human operator 30 and is keyed into processor 26 or, alternatively, is keyed into another computer linked to processor 26.

The document processing functions described hereinbelow are preferably performed using software running on processor 26, which implements an embodiment of the present invention. The software may be supplied on tangible media, such as diskettes or CD-ROM, and loaded into the processor. Alternatively, the software may be downloaded to the processor via a network connection or other electronic link. Further alternatively, processor 26 may comprises dedicated, hard-wired elements or a digital signal processor for carrying out some or all of the image processing steps.

Figure 2:
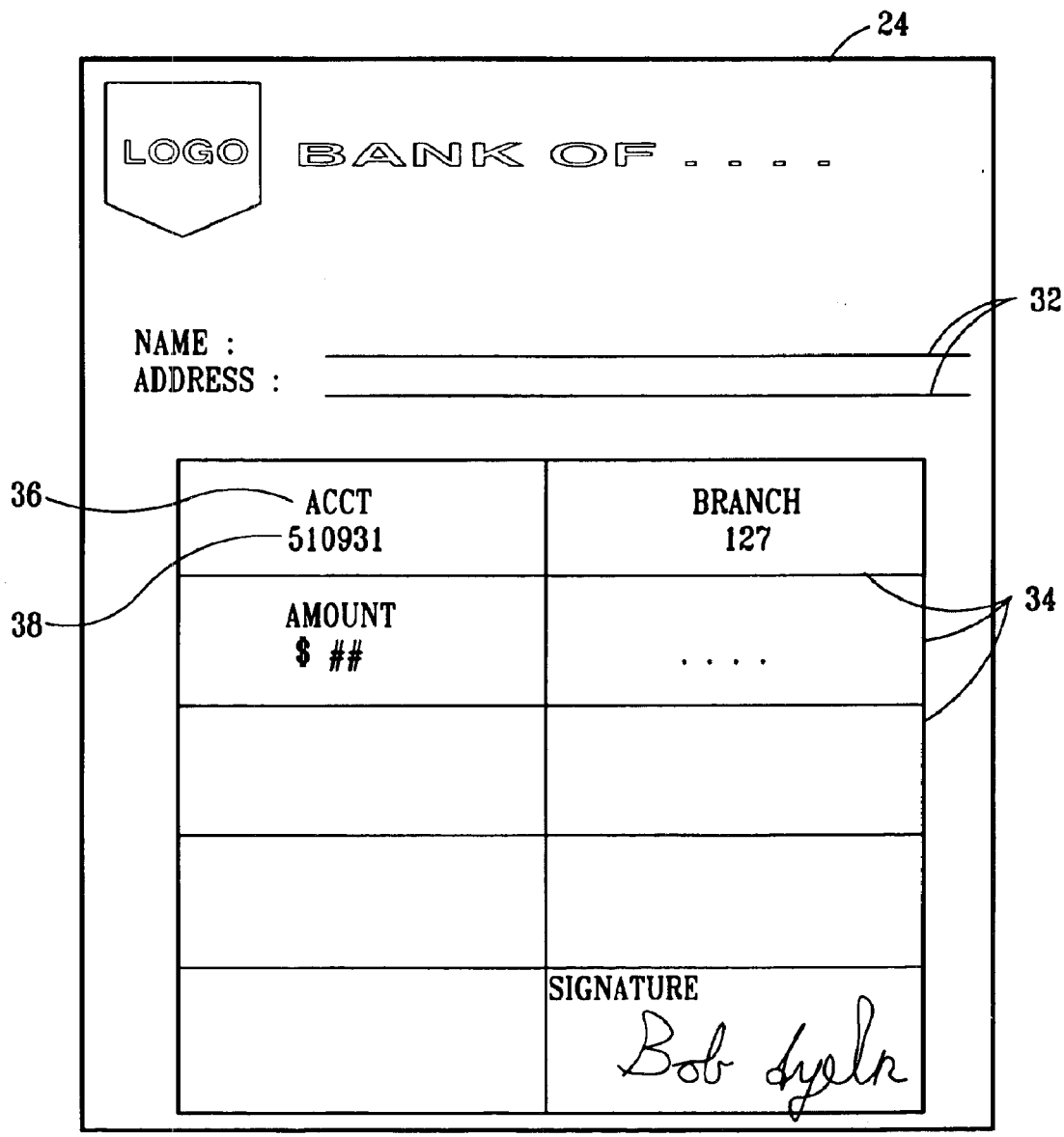
FIG. 2 is a schematic representation of a form document, used in illustrating preferred embodiments of the present invention.

FIG. 2 is a schematic illustration of form document 24, useful in understand the embodiments of the present invention described hereinbelow. The form comprises a template made up of elements such as lines 32, boxes 34 and preprinted text 36, as well as other graphics. The lines and boxes define fields, which are filled in by hand or machine, typically with alphanumeric characters, such as fill-in characters 38 shown in the "ACCT" box. A human key-in operator would readily identify this box as indicating an account number of a person who filled in the form (or for whom the form was filled in). For processor 26 to be autonomously able to make such an identification, however, it is necessary that the processor register the image of document 24 with an appropriate stored template and then determine the proper field identification from the template. Typically, the template and corresponding field identities are known and stored in advance in memory 28, but this is not always the case. Preferred embodiments of the present invention provide methods for automatic processing images of form documents when the template and/or field identities are not pre-stored in system 20.

Figure 3:
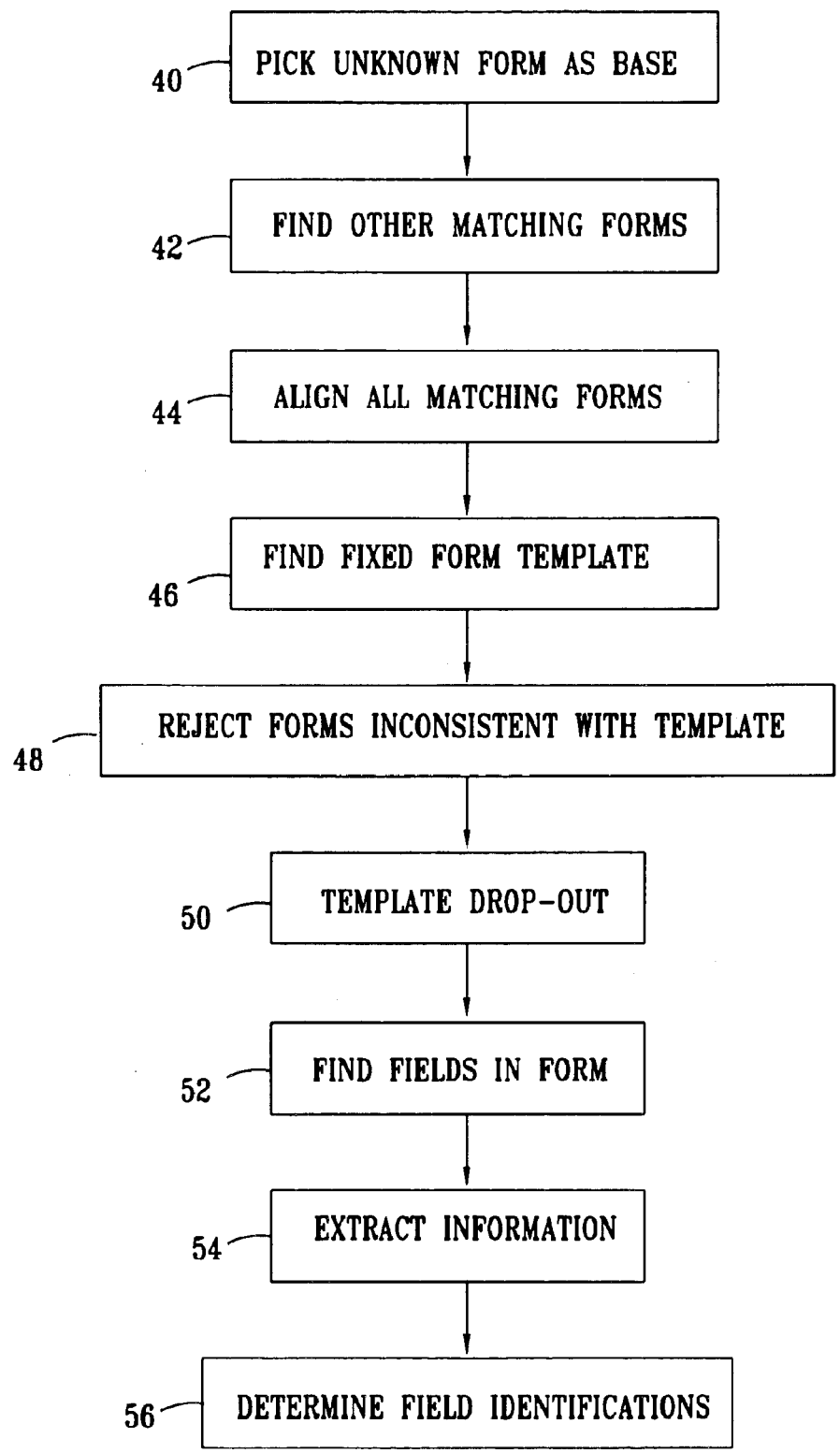
FIG. 3 is a flow chart that schematically illustrates a method for processing document images, in accordance with a preferred embodiment of the present invention.

FIG. 3 is a flow chart that schematically illustrates a method for processing of form document images, such as document 24, in accordance with a preferred embodiment of the present invention. The method assumes that there is a group of these images that do not match any pre-stored template in the system. At an initial step 40, one of the non-matching images is chosen as a "base image" for the purpose of finding a template that was used in the documents from which these images were made. At a matching step 42, the other images in the group are compared to the base image, in order to choose the ones that appear to share a common form template with the base image. The inventors have found empirically that a group of 50 sample images of a given form type, having a common, unknown template, is sufficient to obtain reliable results from this method, although smaller numbers of samples may also be used. All of the images chosen at step 42 are mutually aligned at an alignment step 44, using methods of image transformation known in the art, such as those described in the abovementioned U.S. Pat. Nos. 5,182,656 and 5,793,887.

The aligned images are processed to find a common, fixed form template in the images, at a template extraction step 46. Details of this step are described below with reference to FIGS. 4, 5, 6 and 7. Once this template has been found, the chosen images are again checked to ascertain that they do actually match the template. Forms that are not consistent with the template are set aside for later processing, at an inconsistency rejection step 48. It is possible that these rejected images belong to some other new template, and they are preferably saved until a sufficient group of like images has been assembled so that the process of FIG. 3 can be repeated.

At a template drop-out step 50, for each image corresponding to the new template, the template itself is erased from the image, preferably using methods described in the above-mentioned patents. Most preferably, the template drop-out is carried out in a manner that is designed to minimize any deleterious impact on the readability of characters filled into the template. A drop-out method of this type is described, for example, in U.S. patent application Ser. No. 09/379,244, which is assigned to the assignee of the present patent application, and whose disclosure is incorporated herein by reference. What remains of the form images at this point, following template drop-out, is the variable filled-in content, typically alphanumeric characters. At a field finding step 52, this content is processed to determine the boundaries of the fields in the post-drop-out form images. Preferably, the images are merged in order to find optimal boundaries that are applicable to substantially all of the images, and which will also be applicable to subsequent images based on the same template.

For each field of each form image, processor 26 extracts the filled-in information, typically using OCR, as mentioned above, at an information extraction step 54. At a field identification step 56, the extracted information from each of the fields is associated with a corresponding field identifier. In other words, the meaning of the information in each field (such as name, address, account number, etc., as illustrated in FIG. 2) is determined. This meaning may be explicitly input to processor 26 by operator 30, but preferably it is ascertained by the processor automatically, as described hereinbelow with reference to FIGS. 8 and 9. At this point, system 20 has completed finding a new template and identification of the fields in the template, so that later forms based on this template can be processed fully automatically.

Figure 4:
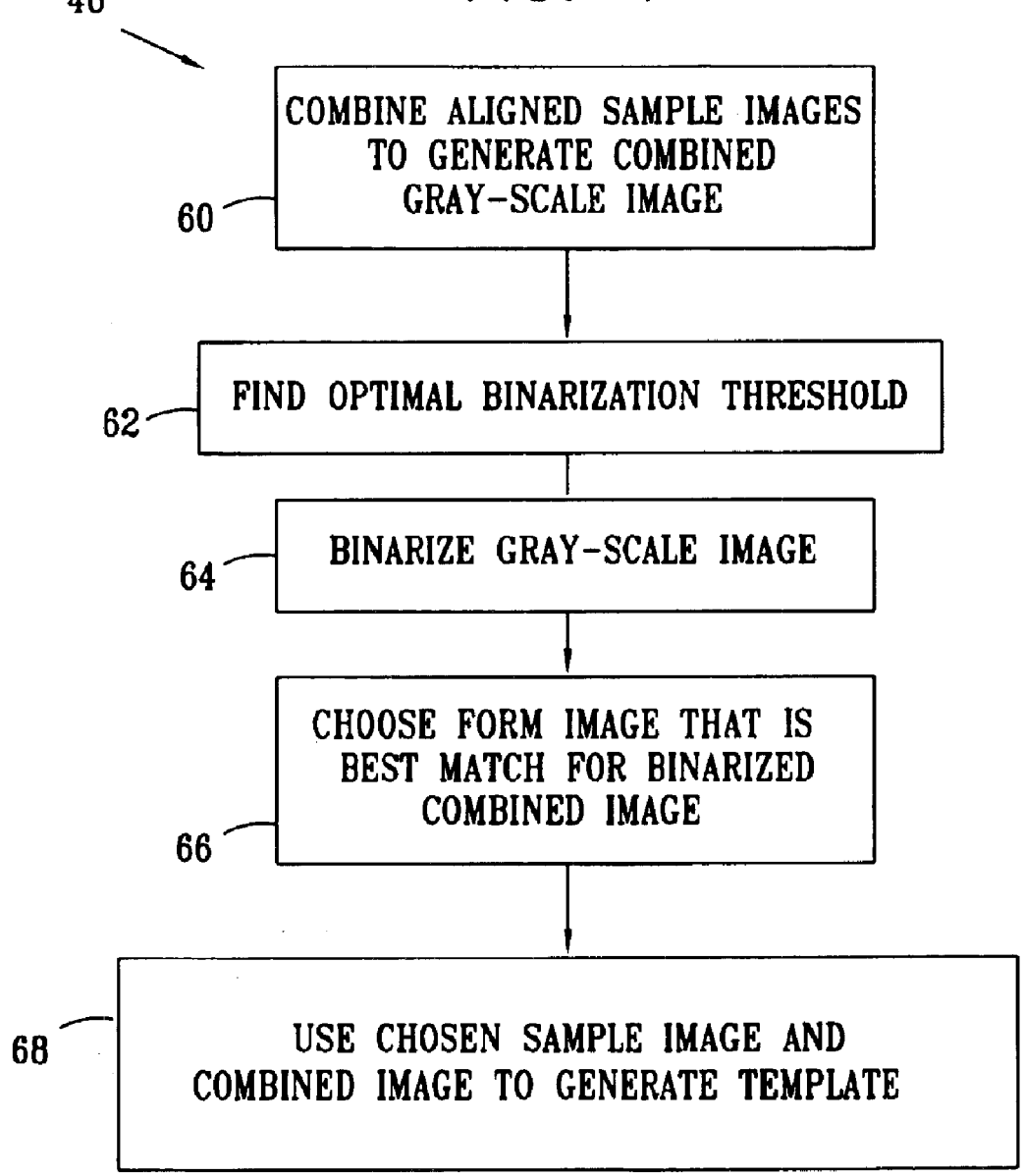
FIG. 4 is a flow chart that schematically illustrates a method for recreating a template that is common to a group of document images, in accordance with a preferred embodiment of the present invention.

FIG. 4 is a flow chart that schematically illustrates details of template extraction step 46, in accordance with a preferred embodiment of the present invention. Other methods for extracting the common template from a group of images based on the template will also be apparent to those skilled in the art and are considered to be within the scope of the present invention. At an image combination step 60, the set of sample images chosen at step 42, in the appropriate mutual alignment from step 44, are summed to generate a gray-scale image. Preferably, the images that are summed comprise binary images, although gray-scale images can also be treated in a similar manner, mutatis mutandis. The gray-scale value of each pixel in the combined image thus corresponds to the number of sample images in which that pixel appears as a black pixel, so that the higher the value of a given pixel, the likelier it is that this pixel belongs to the template.

At a threshold finding step 62, an optimal threshold is found for binarizing the combined image, in order that the image following binarization will correspond as closely as possible to the actual template. The combined image is then binarized using this threshold, at a binarization step 64. Details of a preferred method for finding the optimal threshold are described hereinbelow with reference to FIG. 5.

In order to generate the final template image, the sample image that most closely matches the binarized combined image is chosen, at an image choosing step 66. The chosen sample image and the combined gray-scale image are then jointly processed to generate the final template, at a template generation step 68. Details of steps 66 and 68 are described hereinbelow with reference to FIGS. 6 and 7, respectively.

Figure 5:
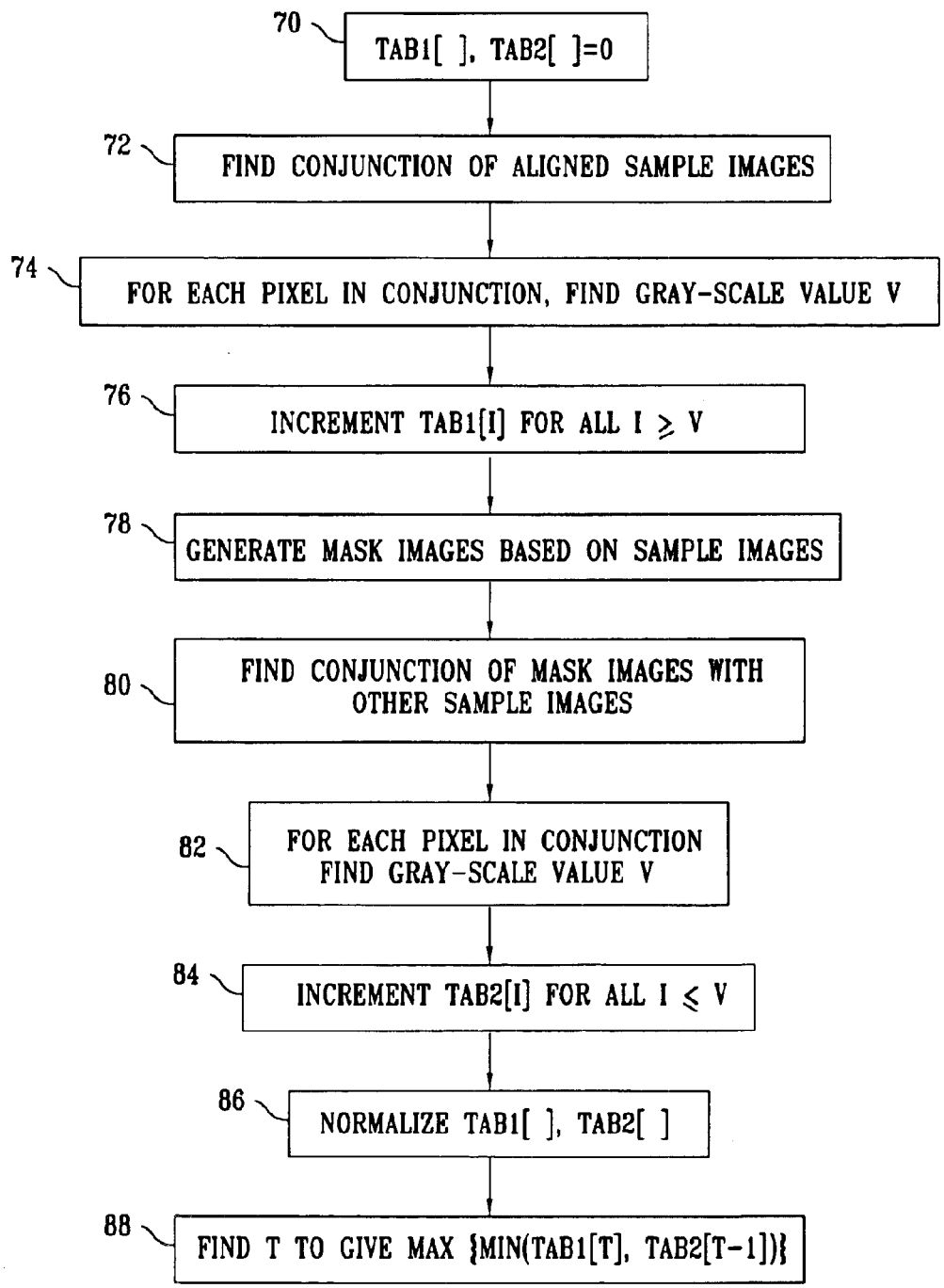
FIGS. 5, 6 and 7 are flow charts that schematically illustrates details of the method of FIG. 4, in accordance with preferred embodiments of the present invention.

FIG. 5 is a flow chart that schematically illustrates details of threshold finding step 62, in accordance with a preferred embodiment of the present invention. For this purpose, two tables are defined and initialized at a table initialization step 70. The first of these tables, TAB1[T], gives an estimate of the fraction of the total number of pixels in the combined image that are part of the fixed template and have suprathreshold gray-scale values, for each possible choice of the threshold T. The second table, TAB2[T], gives a corresponding estimate of the fraction of the pixels in the combined image that belong to the variable, fill-in part of the image and have sub-threshold values, for each T. The object of these tables is to enable the actual threshold to be set so as to most faithfully separate the fixed and variable parts of the sample images.

At a sample conjunction step 72, the conjunction (logical AND) of each pair of aligned sample images is found, pixel-by-pixel. (It is assumed that the sample images are binary, with black=1.) Alternatively, not all possible pairs of sample images are processed in this manner, but only a representative subset, preferably selected at random. If a given pixel is black in both of the input sample images, it is marked as black in the resultant conjunction image. For each of the black pixels in the conjunction, the gray-scale value V of the corresponding pixel in the combined image is found, at a first gray-scale finding step 74. For each I between V and N, wherein N is the number of sample images, the corresponding entry of the first table, TAB1[I], is then incremented at a first table incrementing step 76. Steps 74 and 76 are repeated for all of the pixels in all of the pairs of sample images.

To fill in the entries of TAB2[ ], a mask image is computed for each of the sample images, or for a representative subset of the images, at a mask generation step 78. Preferably, the mask image is found by morphologically expanding the locus of the black pixels in the sample image, most preferably by two pixels in every direction, and then conjugating the expanded image, i.e., taking its "negative." The conjunction of each pair of these mask images is found at a mask conjunction step 80, in a manner similar to the conjunction of the sample images themselves at step 72. At a second gray-scale finding step 82, the gray-scale value V of the corresponding pixel in the combined image is found for each of the black pixels in this new conjunction. Then, at a second table incrementing step 84, the entries of the second table, TAB2[I], are incremented for each I between zero and V.

The entries of the two tables TAB1[ ] and TAB2[ ] are normalized, at a table normalization step 86, preferably by dividing each of the entries in each of the tables by the respective sum of all of the entries in that table. The binarization threshold is then chosen, at a threshold selection step 88, to be that threshold T for which the minimum of TAB1[T] and TAB2[T−1] is maximal.

Figure 6:
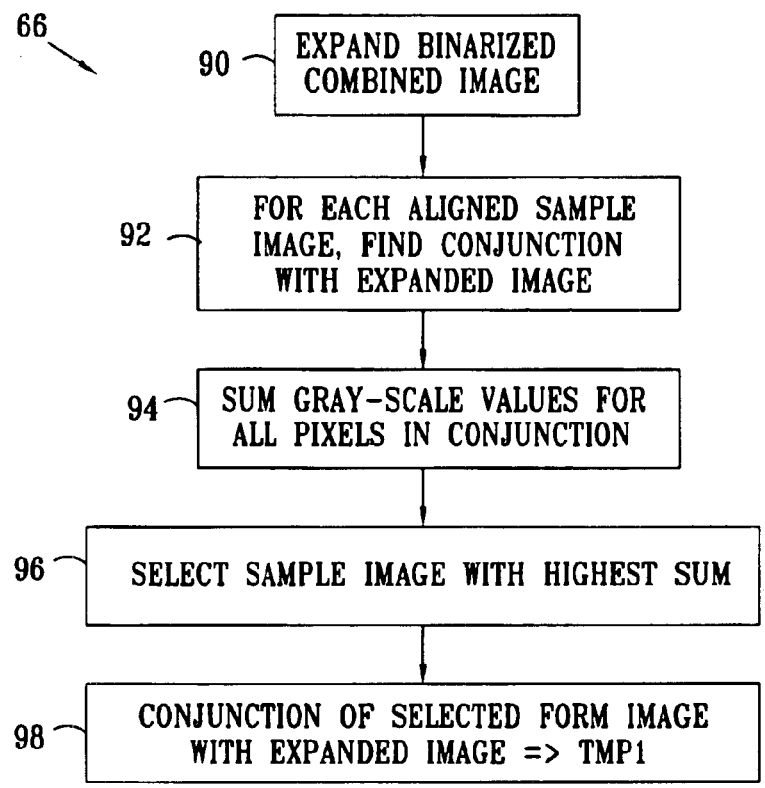

FIG. 6 is a flow chart that schematically illustrates details of image choosing step 66, in accordance with a preferred embodiment of the present invention. In this step, the sample image that is best suited for use as the basis for generating the new template is chosen. This is typically the image that has the highest correlation with the combined image. To choose this sample image, the binarized combined image, from step 64, is morphologically expanded, at a first image expansion step 90. Preferably, the image is expanded by one pixel in every direction. The pixel-by-pixel conjunction of the expanded image from step 90 with each of the sample images is found, at an expanded image conjunction step 92. Then, for each sample image, for all of the pixels having the value 1 (black) in the conjunction, the sum of the gray-scale values of all of the corresponding pixels in the combined gray-scale image is computed, at a summing step 94. The sample image that has the highest sum is selected for use as the basis for the new template, at an image selection step 96. The corresponding pixel-by-pixel conjunction from step 92 is saved, as an image file TMP1, at a temporary save step 98.

Figure 7:
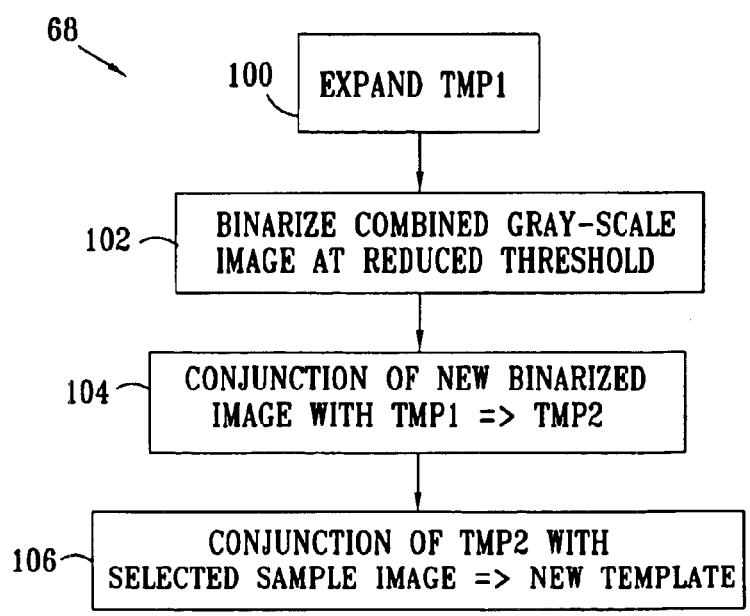

FIG. 7 is a flow chart that schematically illustrates details of template generation step 68, in accordance with a preferred embodiment of the present invention. In this step, the selected sample image from step 96 is processed to remove its variable, filled-in portion and thus to yield the new template. At a temporary image expansion step 100, the conjunction image TMP1 is morphologically expanded, preferably by a single pixel in all directions. The combined gray-scale image from step 60 is again binarized, at a new binarization step 102, this time at a lower binarization threshold than was used at step 64. Preferably, the new threshold at step 102 is set to $T-N/4$, wherein T is the previous threshold, and N is the number of sample images.

The conjunction of this new binarized image with TMP1 is computed, at a new conjunction step 104, to generate a new conjunction image TMP2. This new image is made up of pixels that have high gray-scale values in the combined image and are known with high likelihood to belong to the template or to be in the near vicinity of pixels in the template. The conjunction of TMP2 with the selected sample image from step 96 gives the new template for the group of sample images, at a new template formation step 106.

FIG. 8 is a flow chart that schematically illustrates details of field identification step 56, in accordance with a preferred embodiment of the present invention. This method is based on comparing the information extracted from a group of sample form documents at step 54 with data that has been keyed-in manually by human operators, such as operator 30, from the same documents. The filled-in documents and the information automatically extracted therefrom by processor 26 are collected, at a sample collection step 110. Although the locations of the fields on the forms are known at this point, their respective identifications are not. Preferably, the sample forms used for this purpose are the same ones that were used to find the form template at step 46. Alternatively, a different group of samples may be used, and the method of FIG. 8 may be carried out independently of the methods of template generation described hereinabove.

The sample forms are passed to the human operators for processing, at a manual processing step 112. For each of the forms, the operators key in the information in each of the fields of the form into a computer, either into processor 26 or into another computer linked to processor 26. The operator keys in each piece of information alongside its appropriate field identifier, such as the name, address, account number, etc., shown on document 24 (FIG. 2), in accordance with standard data keying practice. At a matching step 114, processor 26 compares the alphanumeric information that it has extracted at step 54 from each document with the corresponding keyed-in information for that document. By matching the pieces of information, the processor is able to conclude, for example, that the field from which it read the number "510931" is, in fact the account number field. All of the information is matched in this manner so that the identities of all of the fields can be determined. Preferably, enough sample forms are evaluated so that the field identities can be verified with a high level of confidence, and any discrepancies can be resolved. The field identities are then stored in memory 28 for reference in processing subsequent form images, preferably along with the new template found at step 46.

FIG. 9 is a flow chart that schematically illustrates a method for refining the set of form identifications found at step 114, in accordance with a preferred embodiment of the present invention. After the process of FIG. 8 has been completed, new forms are input, at a new form processing step 120. The information contained in these new forms is extracted using the field identifications that were found previously. Each form is then checked, at a verification step 122, to determine whether there is any remaining information filled into the form that was not covered by the identified fields. If any such information is found, and processor 26 is capable of extracting the information, typically by OCR, it may be an indication that there are one or more additional fields in the form template that were not previously accounted for. For example, these fields may have been left blank in the original group of sample images.

To the extent that any information is unaccounted for in a given sample form, the form is sent for manual keying-in, at a key-in step 124. The key-in data and OCR data from this form are collected and saved at a new sample collection step 126. When enough new samples have been collected having this additional, unidentified data field, at a sufficient samples step 128, the new field can be identified and added to the stored group of field identifications for this template. Finding the boundaries of this field proceeds at step 52, as described hereinabove, followed by determining the correct field identification at step 56.

Although the preferred embodiments described herein are concerned with processing of form documents, the principles of the present invention may similarly be applied in other image processing contexts in which a known template must be identified within an image whose content may vary. Furthermore, although preferred embodiments are described herein with reference to processing of binary images, as are commonly used in document image processing, it will be appreciated that the methods of the present invention may be applied, mutatis mutandis, to gray-scale and color images, as well.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for processing a plurality of input images containing variable content that is filled into respective, fixed templates, the method comprising:

storing a set of one or more reference templates in a memory;

comparing the images to collect a group of the images that do not match any of the one or more stored reference templates and which have a high degree of similarity therebetween;

combining the images in the group so as to distinguish the variable content from a fixed portion common to a preponderant number of the images in the group;

processing the fixed portion to reconstruct a new template, not previously stored in the memory, that is common to at least some of the images among the preponderant number; and extracting information from the images using the reconstructed template.

2. A method according to claim 1, wherein combining the images comprises mutually aligning and summing the images.

3. A method according to claim 2, wherein each of the input images comprises a plurality of pixels having respective pixel values, and wherein summing the images comprises generating a gray-scale image in which the gray-scale value of each pixel is a sum of the pixel values of the corresponding pixels in the input images.

4. A method according to claim 3, wherein the pixels in the fixed portion of the gray-scale image are characterized generally by higher gray-scale values than the other pixels in the gray-scale image.

5. A method according to claim 3, wherein combining the images comprises binarizing the gray-scale image, so that the pixels in the fixed portion generally receive a first binary value, and the pixels corresponding to the variable content generally receive a second, different binary value.

6. A method according to claim 5, wherein binarizing the gray-scale image comprises testing a plurality of binarization thresholds so as to find one of the threshold that optimally distinguishes the variable content from the fixed portion.

7. A method according to claim 1, wherein processing the fixed portion comprises choosing one of the images from among the preponderant number and combining the chosen image with the fixed portion common to the preponderant number in order to extract the new template from the chosen image.

8. A method according to claim 7, wherein choosing the one of the images comprises choosing an image having a high measure of similarity to the fixed portion.

9. A method according to claim 1, wherein extracting the information comprises removing the reconstructed template from the images.

10. A method according to claim 1, wherein extracting the information comprises finding, responsive to the template, respective locations of fields in the images that contain the information and automatically extracting the information contained in the fields.

11. A method according to claim 10, wherein reading the information contained in the fields comprises:

processing one or more of the images in the group manually, so as to record, for each of the fields, the information filled into the field in conjunction with an identification of the field; and automatically comparing the manually-recorded information with the automatically-extracted information to find, for each of the fields, a correspondence between the identification of the field and its location.

12. A method according to claim 1, wherein the input images comprise images of documents on which the respective templates are pre-printed, and wherein the variable content comprises alphanumeric characters filled into fields of the templates.

13. A method for processing a group of images containing variable information that is filled into a common template, the method comprising:

processing one or more of the images automatically to determine respective locations of fields in the images that are filled in with the variable information;

automatically extracting the information from the fields;

processing the one or more images manually, so as to record by manual key-in, for each of the fields, the information filled into the field in conjunction with an identification of the field;

automatically comparing the manually-recorded information with the automatically-extracted information to find, for each of the fields, a correspondence between the identification of the field and its location; and processing additional images in the group to automatically extract the variable information therefrom and, using the correspondence, to identify the extracted information.

14. A method according to claim 13, wherein automatically extracting the information comprises reading alphanumeric characters contained in the fields.

15. A method according to claim 13, wherein processing the additional images comprises detecting, in one of the additional images, information in a new location that does not correspond to any of the fields for which the correspondence was found, and sending the one of the additional images to be processed manually.

16. A method according to claim 15, wherein automatically extracting the information from the fields comprises extracting the information in the new location, and wherein automatically comparing the manually-recorded information with the automatically-extracted information comprises finding a correspondence between the new location and an identification of a field in the new location.

17. A method according to claim 13, wherein the images comprise images of documents on which the template is pre-printed, and wherein the variable information comprises alphanumeric characters filled into fields of the templates.

18. Image processing apparatus, comprising:

an image input device, which is adapted to provide a plurality of input images containing variable content that is filled into respective, fixed templates;

a memory, which is arranged to store a set of one or more reference templates; and a processor, which is adapted to receive and compare the images to collect a group of the images that do not match any of the one or more stored reference templates and which have a high degree of similarity therebetween, to combine the images in the group so as to distinguish the variable content from a fixed portion common to a preponderant number of the images in the group, to process the fixed portion to reconstruct the fixed a new template, not previously stored in the memory, that is common to at least some of the images among the preponderant number, and to extract information from the images using the reconstructed template.

19. Apparatus according to claim 18, wherein the input images comprise images of documents on which the respective templates are pre-printed, and wherein the variable content comprises alphanumeric characters filled into fields of the templates.

20. Image processing apparatus, comprising:

an image input device, which is adapted to provide a group of images containing variable information that is filled into a common template; and a processor, which is adapted to process one or more of the images automatically to determine respective locations of fields in the images that are filled in with the variable information, to automatically extract the information from the fields and to compare the automatically-extracted information with manually-extracted information, recorded by manual key-in in manual processing of the images and including, for each of the fields, the information filled into the field in conjunction with an identification of the field, so as to automatically find, for each of the fields, a correspondence between the identification of the field and its location, and to process additional images in the group to automatically extract the variable information therefrom and, using the correspondence, to identify the extracted information.

21. Apparatus according to claim 20, wherein the images comprise images of documents on which the template is pre-printed, and wherein the variable information comprises alphanumeric characters filled into fields of the templates.

22. A computer software product for processing a plurality of input images containing variable content that is filled into respective, fixed templates, wherein a set of one or more reference templates is stored in a memory accessible to a computer, the product comprising a computer-readable medium in which computer program instructions are stored, which instructions, when read by the computer, cause the computer to compare the images to collect a group of the images that do not match any of the one or more stored reference templates and which have a high degree of similarity therebetween, to combine the images in the group so as to distinguish the variable content from a fixed portion common to a preponderant number of the images in the group, to process the fixed portion to reconstruct a new template, not previously stored in the memory, that is common to at least some of the images among the preponderant number, and to extract information from the images using the reconstructed template.

23. A computer software product for processing a group of images containing variable information that is filled into a common template, the product comprising a computer-readable medium in which computer program instructions are stored, which instructions, when read by a computer, cause the computer to process one or more of the images automatically to determine respective locations of fields in the images that are filled in with the variable information, to automatically extract the information from the fields and to compare the automatically-extracted information with manually-extracted information, recorded by manual key-in in manual processing of the images and including, for each of the fields, the information filled into the field in conjunction with an identification of the field, so as to automatically find, for each of the fields, a correspondence between the identification of the field and its location, and to process additional images in the group to automatically extract the variable information therefrom and, using the correspondence, to identify the extracted information.

* * * * *